(12) United States Patent
Frederick et al.

(10) Patent No.: US 10,457,183 B2
(45) Date of Patent: Oct. 29, 2019

(54) VEHICLE WITH A DISCONNECTABLE HANDLE

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 8 days.

(21) Appl. No.: 15/885,604

(22) Filed: Jan. 31, 2018

(65) Prior Publication Data
US 2019/0232846 A1    Aug. 1, 2019

(51) Int. Cl.
| | | |
|---|---|---|
| *B60J 5/04* | (2006.01) | |
| *B60N 3/02* | (2006.01) | |
| *E05B 79/06* | (2014.01) | |
| *E05B 85/10* | (2014.01) | |
| *B60N 99/00* | (2006.01) | |

(52) U.S. Cl.
CPC ............ B60N 3/026 (2013.01); B60N 99/00 (2013.01); E05B 79/06 (2013.01); E05B 85/10 (2013.01)

(58) Field of Classification Search
CPC ......... B60N 3/026; B60N 99/00; E05B 79/06; E05B 85/10
See application file for complete search history.

(56) References Cited

U.S. PATENT DOCUMENTS

| | | | | |
|---|---|---|---|---|
| 2008/0088139 | A1* | 4/2008 | Sunahara | E05B 85/16 292/336.3 |
| 2011/0042973 | A1* | 2/2011 | Yoshino | E05B 79/06 292/336.3 |
| 2016/0032627 | A1* | 2/2016 | Yoshino | E05B 85/16 292/336.3 |
| 2016/0138304 | A1* | 5/2016 | Nagata | E05B 81/78 292/336.3 |

FOREIGN PATENT DOCUMENTS

| | | |
|---|---|---|
| DE | 19522782 A1 | 12/1996 |
| DE | 102015014634 B3 | 3/2017 |
| WO | WO-2014203927 A1 * 12/2014 | ............. E05B 81/78 |

* cited by examiner

*Primary Examiner* — Lori L Lyjak
(74) *Attorney, Agent, or Firm* — Christopher G. Darrow; Darrow Mustafa PC (57) ABSTRACT

A vehicle includes a body, a handle, and at least one connection site for the handle at which the handle is selectively connectable to the vehicle. The body defines a passenger compartment and a door opening, and includes a door over the door opening. The at least one connection site includes a home connection site on the door. When connected to vehicle at the home connection site, the handle, from its corresponding location on the door, is subject to being operated by a user to allow the door to open.

20 Claims, 7 Drawing Sheets

VEHICLE WITH A DISCONNECTABLE HANDLE

TECHNICAL FIELD

The embodiments disclosed herein relate to passenger vehicles and, more particularly, to their handles.

BACKGROUND

The traditional passenger vehicle includes multiple fixed single-use handles, including but not limited to one or more door handles included as part of each door's locking system, as well as one or more grab handles.

SUMMARY

Disclosed herein are embodiments of a vehicle with a disconnectable handle. In one aspect, a vehicle includes a body, a handle, and at least one connection site for the handle at which the handle is selectively connectable to the vehicle. The body defines a passenger compartment and a door opening, and includes a door over the door opening. The at least one connection site includes a home connection site on the door. When connected to vehicle at the home connection site, the handle, from its corresponding location on the door, is subject to being operated by a user to allow the door to open.

In another aspect, a vehicle includes a body, a handle, and multiple connection sites for the handle at which the handle is selectively connectable to the vehicle. The body defines a passenger compartment and a door opening, and includes a door over the door opening. The multiple connection sites include a supplemental connection site on the vehicle elsewhere than the door. When connected to vehicle at the supplemental connection site, the handle, from its corresponding location on the vehicle, is subject to being grabbed by a user for support.

In yet another aspect, a vehicle includes a body, a handle, and at least one connection site for the handle at which the handle is selectively connectable to the vehicle. The body defines a passenger compartment and a door opening, and includes a door over the door opening. The handle includes an integral implement. When disconnected from the vehicle, the handle, in the hands of a user, is configured to serve an off-vehicle role associated with the implement.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicle that includes a disconnectable handle. In relation to the handle, the vehicle features one or more user-accessible connection sites therefor. At each connection site, the handle is selectively connectable to the vehicle. When connected to the vehicle at a connection site, the handle is configured to serve an associated on-vehicle role. In conjunction with different connection sites, the same handle is configured to serve different on-vehicle roles when connected to the vehicle at the different connection sites. For instance, when connected to the vehicle at a "home" connection site on a door, the handle serves as a traditional door handle. And, when connected to the vehicle at a supplemental connection site elsewhere on the vehicle, the handle serves as a traditional grab handle. On the other hand, when disconnected from the vehicle, the handle is configured to serve one or more off-vehicle roles in the hands of a user. For instance, the handle is configured to scrape ice, work everyday objects, illuminate objects, gauge information about the vehicle, defend against offensive contact, or any combination of these.

Figure 1A:
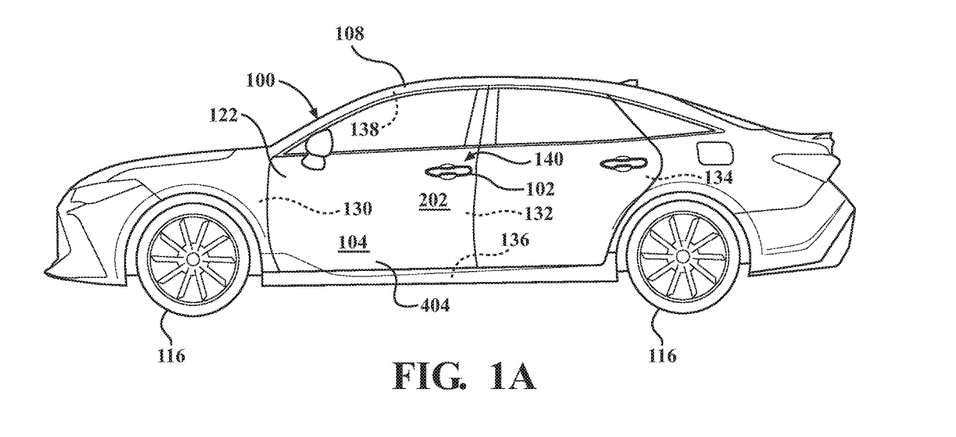
FIG. 1A is a side view of a vehicle that includes a disconnectable handle, and that features a number of user-accessible connection sites at which the handle is selectively connectable to the vehicle, representing the handle being connected to the vehicle at a home connection site on a door, with the handle thus serving as a door handle.
Figure 1B:
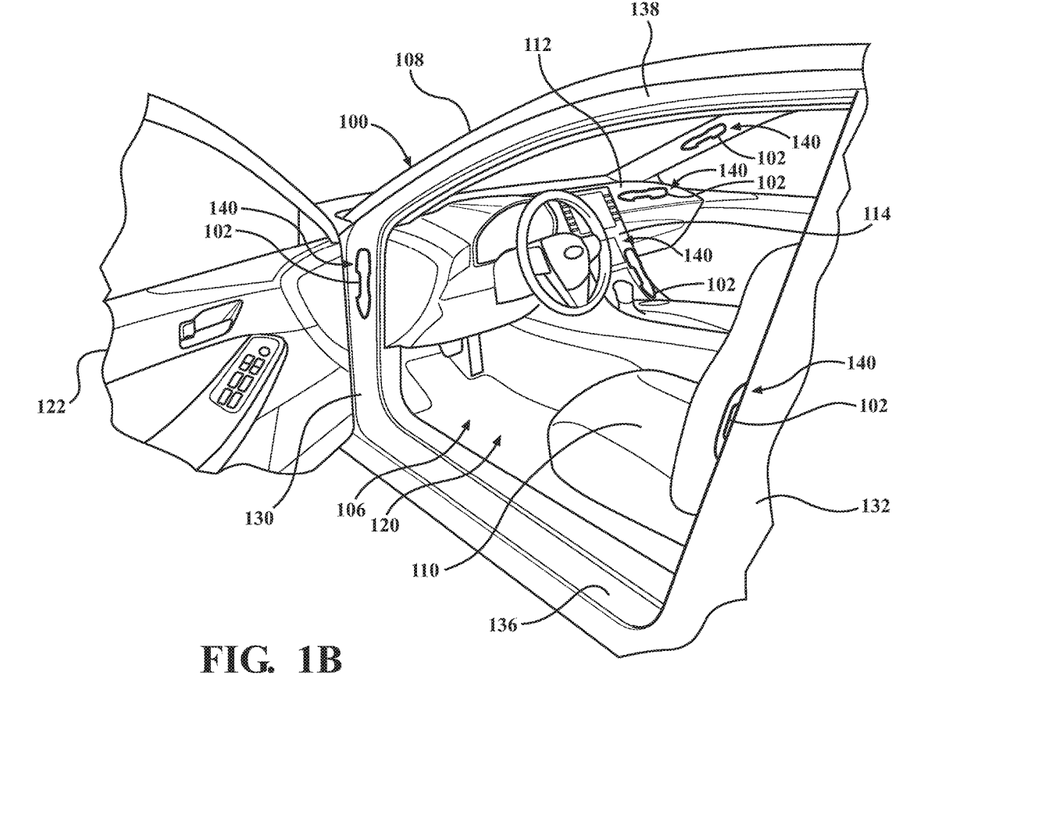
FIG. 1B represents, with reference to a perspective view of the vehicle with the door in an open position, the handle being connected to the vehicle at supplemental connection sites around a corresponding door opening and about a passenger compartment, with the handle thus serving as a grab handle.

A representative passenger vehicle 100 with a disconnectable handle 102 is shown in FIGS. 1A and 1B. In this description, uses of "front," "forward" and the like, and uses of "rear," "rearward" and the like, refer to the longitudinal directions of the vehicle 100. "Front," "forward" and the like refer to the front (fore) of the vehicle 100, while "rear,"

"rearward" and the like refer to the back (aft) of the vehicle 100. Uses of "side," "sideways," "transverse" and the like refer to the lateral directions of the vehicle 100, with "driver's side" and the like referring to the left side of the vehicle 100, and "passenger side" and the like referring to the right side of the vehicle 100.

The vehicle 100 has an exterior 104 and a number of interior compartments. The compartments include a passenger compartment 106, an engine compartment and, in the illustrated sedan configuration of the vehicle 100, a trunk. The vehicle 100 has a body 108 that forms its exterior 104 and defines its compartments. The body 108 has two upright sides, as well as a floor, a front end, a rear end, a roof and the like.

The vehicle 100 may include, among other things, seats 110, a dash assembly 112 and a center console 114 housed in its passenger compartment 106. Additionally, the vehicle 100 may include an engine, motor, transmission and other powertrain components housed in its engine compartment or elsewhere in the vehicle 100. Among the other powertrain components, the vehicle 100 includes wheels 116. The wheels 116 support the remainder of the vehicle 100 on the ground. One, some or all of the wheels 116 are powered by the remainder of the powertrain components to drive the vehicle 100 along the ground.

The body 108 is constructed from rigidly interconnected frame members, panels and other body elements, as well as any combination of overlying paneling, trim, upholstery and other body coverings. The body 108 defines a number of door openings 120 that open between the passenger compartment 106 and the exterior 104. Relatedly, the body 108 includes a number of doors 122 corresponding to the door openings 120. The doors 122 serve as closure panels for the passenger compartment 106. Each door 122 is pivotally, slidingly or otherwise connected to the remainder of the body 108 for movement, relative to a corresponding door opening 120, between a closed position and an open position. In the closed position, each door 122 is positioned over a corresponding door opening 120. With the corresponding door opening 120 framed by the surrounding body 108, each door 122 overlaps the surrounding body 108. In the open position, each door 122 is positioned away from the corresponding door opening 120, which allows ingress into and egress out of the passenger compartment 106.

One driver's side upright side is shown, with the other, passenger side upright side, being a mirror image. As part of the upright side, the body 108 includes an upright A-pillar 130, an upright B-pillar 132 and an upright C-pillar 134, as well as a floor rail 136 and a roof rail 138. The A-pillar 130, the B-pillar 132 and the C-pillar 134 are longitudinally spaced apart from one another, with the A-pillar 130 forward of the B-pillar 132 and the C-pillar 134, and the B-pillar 132 forward of the C-pillar 134. The floor rail 136 and the roof rail 138 are vertically spaced apart from one another, and each extend longitudinally between the A-pillar 130, the B-pillar 132 and the C-pillar 134.

At the upright side, the body 108 defines a front door opening 120 between the A-pillar 130 and the B-pillar 132, and a rear door opening 120 between the B-pillar 132 and the C-pillar 134. Relatedly, as part of the upright side, the body 108 includes an upright front door 122 corresponding to the front door opening 120, and an upright rear door 122 corresponding to the rear door opening 120. In the illustrated sedan configuration of the vehicle 100, the front door 122 and the rear door 122 are pivotally connected to the remainder of the body 108. This description follows with reference to the front door 122 of the driver's side upright side or, in other words, the driver's side front door 122. However, it will be understood that this disclosure is applicable in principle to the remaining doors 122, including but not limited to the front door 122 of the passenger side upright side or, in other words, the passenger side front door 122.

As opposed to a traditional vehicle that includes multiple fixed single-use handles, the vehicle 100 includes the handle 102 as a single disconnectable multiuse accessory. In relation to the handle 102, the vehicle 100 features one or more user-accessible connection sites 140 therefor. At each connection site 140, the handle 102 is selectively connectable to the vehicle 100. Specifically, when connected to the vehicle 100 at any then-occupied connection site 140, the handle 102 is nondestructively disconnectable from the vehicle 100. And, when thereafter disconnected from the vehicle 100, the handle 102 is nondestructively reconnectable to the vehicle 100 at any previously-occupied connection sites 140, as well as at any new, previously-unoccupied connection sites 140, if any.

The handle 102, for its part, when connected to the vehicle 100 at a connection site 140, is configured to serve an associated on-vehicle role. For instance, as shown in FIG. 1A, the vehicle 100 features one or more "home" connection sites 140 on the door 122. When connected to the vehicle 100 at a home connection site 140, the handle 102 serves as a traditional door handle. Specifically, from its corresponding location on the door 122, the handle 102 is user-accessible, and subject to being operated by a user to allow the door 122 to open. Although the vehicle 100, as shown, features a home connection site 140 on the exterior 104 of the door 122, it will be understood that this disclosure is applicable in principle to an otherwise similar vehicle 100 featuring a home connection site 140 on the interior of the door 122.

In conjunction with different connection sites 140, the same handle 102 is configured to serve different on-vehicle roles when connected to the vehicle 100 at the different connection sites 140. For instance, as shown in FIG. 1B, in addition to the home connection site 140, the vehicle 100 features one or more supplemental connection sites 140 elsewhere on the vehicle 100. As opposed to serving as a door handle when connected to the vehicle 100 at a home connection site 140, the handle 102 serves as a traditional grab handle when connected to the vehicle 100 at a supplemental connection site 140. Specifically, from its corresponding location on the vehicle 100, the handle 102 is user-accessible, and subject to being grabbed by a user for support. Although the vehicle 100, as shown, features a number of supplemental connection sites 140 on the interior of the vehicle 100, it will be understood that this disclosure is applicable in principle to an otherwise similar vehicle 100 featuring one or more supplemental connection sites 140 on the exterior 104 of the vehicle 100.

In one implementation, the vehicle 100 features one or more supplemental connection sites 140 on the surrounding body 108 or otherwise on the vehicle 100 around the door opening 120. Specifically, as shown, the vehicle 100 features any combination of supplemental connection sites 140 on the A-pillar 130, such as on an upright rearward facing surface of the A-pillar 130, and on the B-pillar 132, such as on an upright forward facing surface of the B-pillar 132. When connected to the vehicle 100 at such a supplemental connection site 140, from its corresponding location on the vehicle 100 around the door opening 120, the handle 102 is subject to being grabbed by a user for support during their ingress into and egress out of the passenger compartment 106. Alternatively, or additionally, the vehicle 100 features one or more supplemental connection sites 140 on the vehicle 100 adjacent the seats 110 or otherwise about the passenger compartment 106. Specifically, as shown, the vehicle 100 features any combination of supplemental connection sites 140 above the seats 110, such as on an interior facing surface of the roof rail 138, and forward of the seats 110, such as on the dash assembly 112 and on the center console 114. When connected to the vehicle 100 at such a supplemental connection site 140, from its corresponding location on the vehicle 100 about the passenger compartment 106, the handle 102 is subject to being grabbed by a seated user for support during operation of the vehicle 100.

Figure 2A:
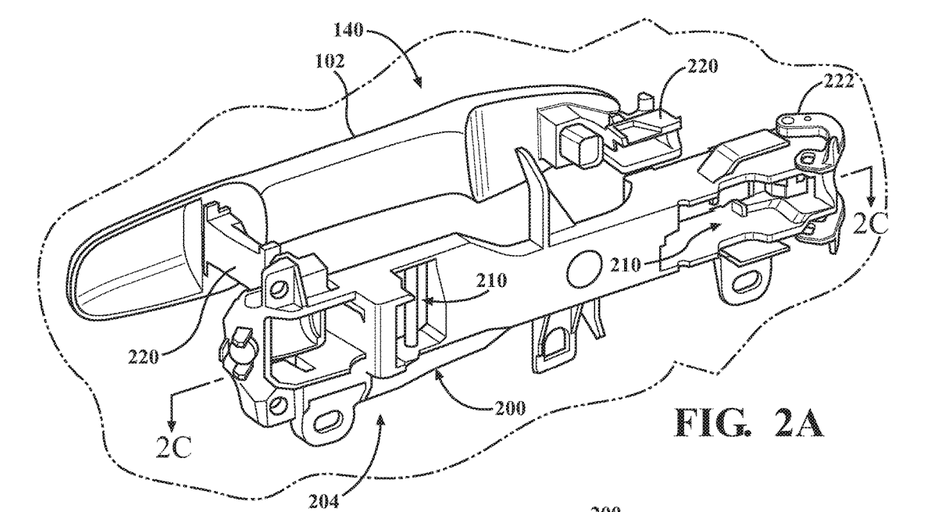
FIG. 2A is a cutaway partial perspective view of the handle and a vehicle element that features a representative connection site, showing a connection system at the connection site that is selectively connectable with the handle, with the connection system including a connection governor.
Figure 2B:
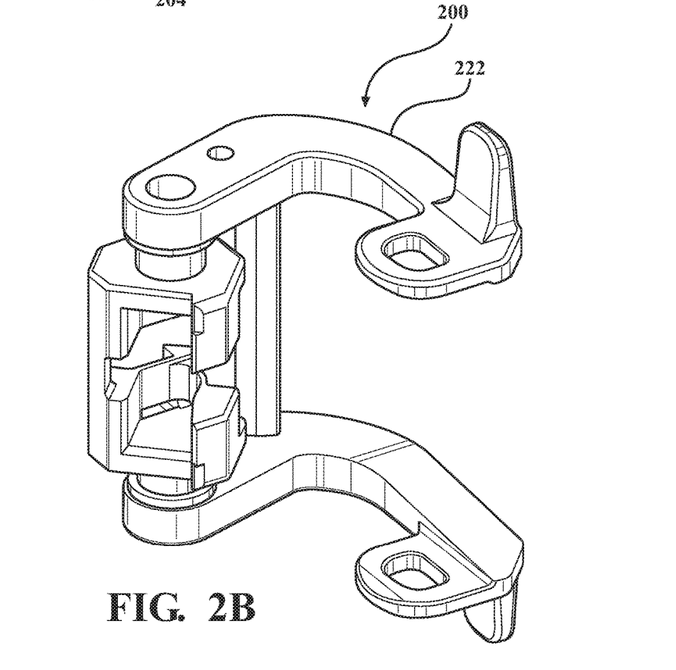
FIG. 2B is a perspective view of the connection governor in isolation from the connection system.
Figure 2C:
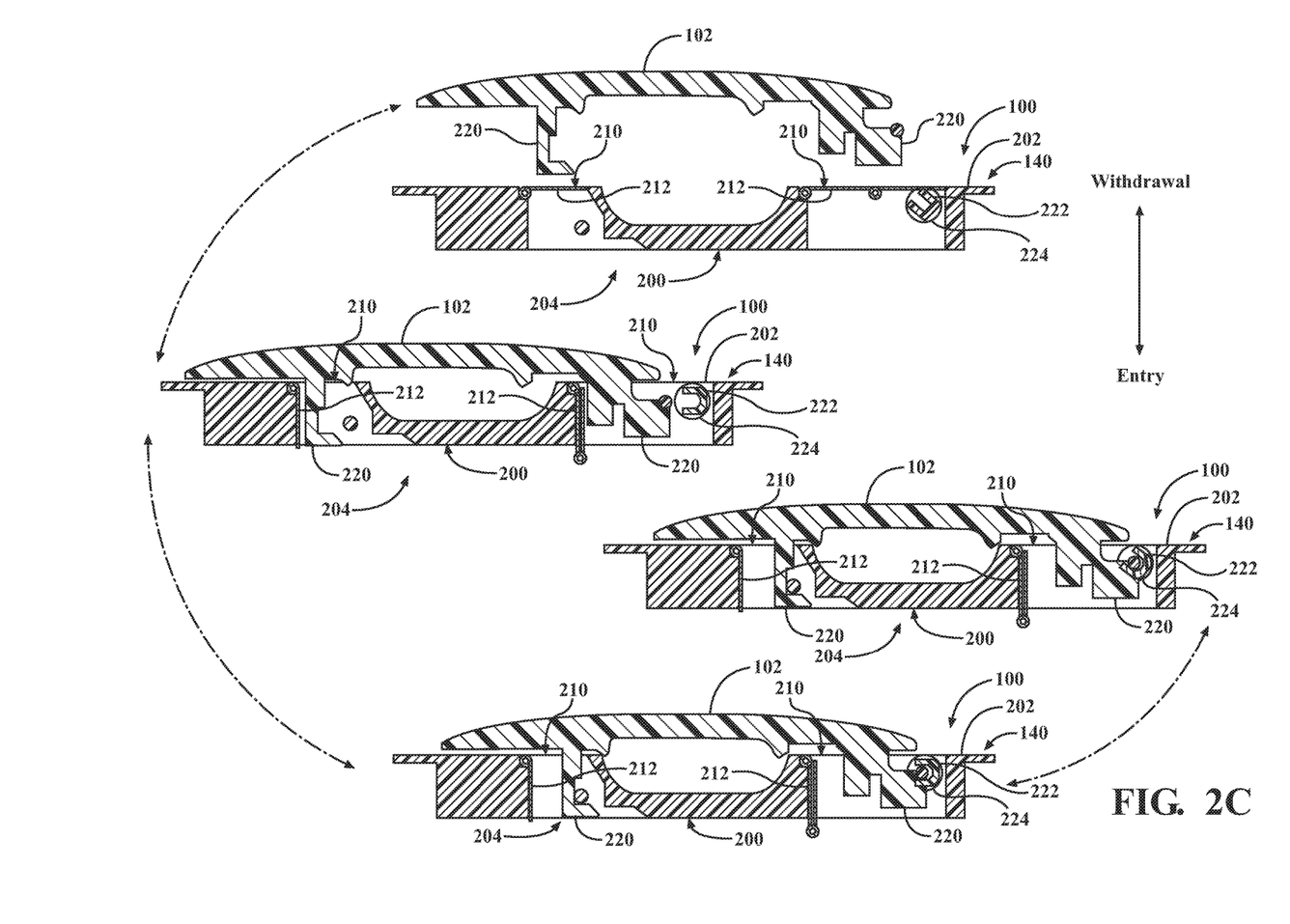
FIG. 2C represents, with reference to cross-sectional views of the handle and the vehicle element along the line 2C-2C in FIG. 2A, the connection of the connection system with the handle and the disconnection of the connection system from the handle.

As shown with additional reference to FIGS. 2A-2C for a representative connection site 140, the vehicle 100 includes a connection system 200 at each connection site 140. As noted above, the handle 102, from its own perspective, is selectively connectable to the vehicle 100 at each connection site 140. Equally, from the perspective of the vehicle 100, the connection system 200 at each connection site 140 is selectively connectable with the handle 102. Specifically, when connected with the handle 102 at the corresponding then-occupied connection site 140, each connection system 200 is nondestructively disconnectable from the handle 102. And, when thereafter disconnected from the handle 102 at the corresponding now-unoccupied connection site 140, each connection system 200 is nondestructively reconnectable with the handle 102.

The connection site 140 is on a user-accessible vehicle surface 202 of a vehicle element, such as the door 122, for a home connection site 140, or the A-pillar 130, the B-pillar 132, the roof rail 138, the dash assembly 112 or the center console 114, as the case may be, for a supplemental connection site 140. At the connection site 140, the vehicle element defines a connection space 204 behind the vehicle surface 202, and houses the connection system 200 in the connection space 204. The connection system 200 is rigidly mounted to the vehicle element. The vehicle element defines one or more entryways 210 that open between the connection space 204 and the vehicle surface 202. Relatedly, the vehicle element includes one or more covers 212 corresponding to the entryways 210. The covers 212 serve as closure panels for the connection space 204. Each cover 212 is retractably or otherwise connected to the remainder of the vehicle element for movement, relative to a corresponding entryway 210, between a closed position and an open position. In the closed position, each cover 212 is positioned over an entryway 210. In the open position, each cover 212 is positioned away from the corresponding entryway 210, which allows entry into and withdrawal from the connection space 204.

For purposes of assuming entry into the connection space 204 while otherwise being user-accessible, the handle 102 includes one or more projections 220 extending from the backside of the handle 102. With the projections 220 in the connection space 204, the connection system 200, from its location behind the vehicle surface 202, is configured to selectively retentively engage the projections 220 from withdrawal from the connection space 204.

Both the connection of the connection system 200 with the handle 102 and the disconnection of the connection system 200 from the handle 102 are represented in FIG. 2C, with the connection process progressing in the counterclockwise direction, and the disconnection process progressing in reverse, in the clockwise direction. In relation to the connection process and the disconnection process, in the hands of a user, the handle 102 is moveable relative to the vehicle 100. Specifically, in relation to the connection process, the handle 102 is connectable to the connection system 200 in one or more connection directions, including an entry direction toward the vehicle surface 202. And, in relation to the disconnection process, the handle 102 is disconnectable from the connection system 200 in one or more reverse disconnection directions, including a withdrawal direction away from the vehicle surface 202.

When the connection site 140 is unoccupied, including before the connection process and after the disconnection process, the covers 212 are moved to the closed positions. The vehicle surface 202 thus has a streamlined appearance notwithstanding the entryways 210.

At the beginning of the connection process, in conjunction with the movement of the covers 212 from the closed positions to the open positions, with the backside of the handle 102 facing the vehicle surface 202, the projections 220 are aligned with the connection system 200 through the entryways 210, and the handle 102 is moved in the connection directions. Under the movement of the handle 102 in the entry direction and other connection directions, if any, the projections 220 assume entry into the connection space 204, and the surrounding backside of the handle 102 assumes a resting position against the vehicle surface 202. Moreover, from its location behind the vehicle surface 202, the connection system 200 retentively engages the projections 220 from withdrawal from the connection space 204. With the handle 102 thus retentively engaged to the vehicle 100, the connection process is concluded.

Thereafter, at the beginning of the disconnection process, the handle 102 is moved in the disconnection directions. Moreover, the connection system 200 disengages the projections 220 from withdrawal from the connection space 204. Under the movement of the handle 102 in the withdrawal direction and other disconnection directions, if any, the projections 220 withdraw from the connection space 204. With the handle 102 thus removed from the vehicle 100, the disconnection process is concluded in conjunction with the movement of the covers 212 from the open positions to the closed positions.

In relation to one, some or all of the connection sites 140, the vehicle 100 includes a connection governing system therefor. At each connection site 140, in relation to the connection system 200, the connection governing system is operable to govern the connection process and the disconnection process in conjunction with the movement of the handle 102. Relatedly, the connection governing system is operable to selectively lock the connection site 140.

From the perspective of the representative connection site 140, the connection governing system is rendered by the connection system 200. Specifically, among the elements of the connection system 200, the vehicle 100 includes a connection governor 222. The connection governor 222, as shown, has an open position and a closed position. The connection system 200 supports the connection governor 222 for movement relative to the vehicle element between the open position and the closed position. The connection governor 222 is complementary to one of the projections 220. In relation to the projection 220, in the open position, the connection governor 222 is open to selectively receiving the projection 220 or selectively releasing the received projection 220. In the closed position, the connection governor 222 is closed to selectively receiving the projection 220 or selectively releasing the received projection 220.

When the connection site 140 is unoccupied, as part of the connection process, the connection governor 222 is moved to the open position. With the connection governor 222 open to receiving the projection 220, under the movement of the handle 102 in the connection directions, the projection 220, beyond assuming entry into the connection space 204, assumes reception into the connection governor 222. Thereafter, as part of the connection process, the connection governor 222 is moved from the open position to the closed position. With the connection governor 222 closed to releasing the received projection 220, the connection system 200 retentively engages the projection 220 from withdrawal from the connection space 204.

Among other things, it follows that, with the connection governor 222 in the open position, and open to receiving the projection 220, the prospect of the connection process is raised. From the perspective of connecting the handle 102 to the vehicle 100, the connection site 140 is thus unlocked. Relatedly, in conjunction with the movement of the handle 102 in the connection directions, the connection process is governed by the movement of the connection governor 222 between the open position and the closed position, including the movement of the connection governor 222 to the open position to unlock the connection site 140, and thereafter, to the closed position. Otherwise, with the connection governor 222 in the closed position, and closed to receiving the projection 220, there is no prospect of the connection process. From the perspective of connecting the handle 102 to the vehicle 100, the connection site 140 is thus locked.

When the connection site 140 is occupied, as part of the disconnection process, the connection governor 222 is moved from the closed position back to the open position. With the connection governor 222 open to releasing the received projection 220, the connection system 200 disengages the projection 220 from withdrawal from the connection space 204. Specifically, under the movement of the handle 102 in the connection directions, the received projection 220, beyond ultimately withdrawing from the connection space 204, releases from the connection governor 222.

Among other things, it follows that, with the connection governor 222 back in the open position, and open to releasing the received projection 220, the prospect of the disconnection process is raised. From the perspective of disconnecting the handle 102 from the vehicle 100, the connection site 140 is thus unlocked. Relatedly, in conjunction with the movement of the handle 102 in the disconnection directions, the disconnection process is governed by the movement of the connection governor 222 between the open position and the closed position, including the movement of the connection governor 222 back to the open position to unlock the connection site 140. Otherwise, with the connection governor 222 still in the closed position, and closed to releasing the received projection 220, there is no prospect of the disconnection process. From the perspective of disconnecting the handle 102 from the vehicle 100, the connection site 140 is thus locked.

Also among the elements of the connection system 200, the vehicle 100 includes a connection actuator 224 for the connection governor 222. The connection actuator 224 is coupled to the connection governor 222, and operable to selectively move the connection governor 222 between the open position and the closed position.

Figure 3:
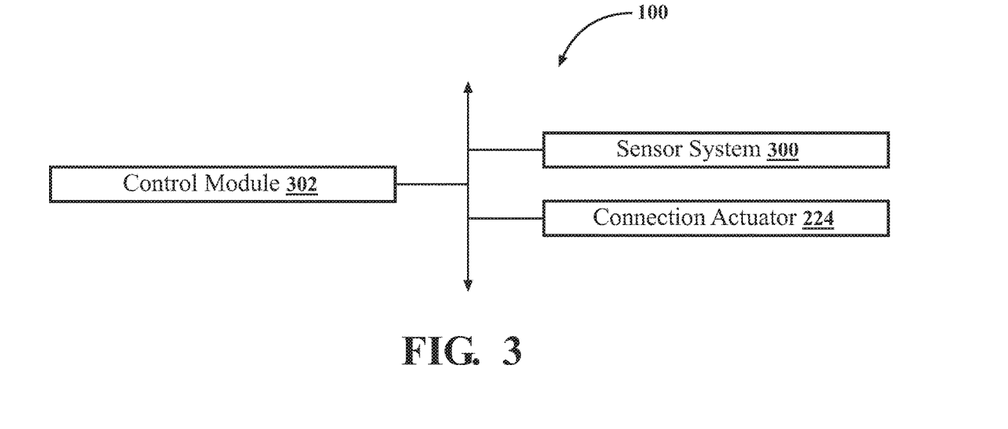
FIG. 3 is a further portrayal of the vehicle using a block diagram, showing a connection actuator for the connection governor, as well as a sensor system and a control module.

As shown with additional reference to FIG. 3, in relation to operating the connection governing system, the vehicle 100 includes a sensor system 300, as well as a control module 302 to which the connection actuator 224 and the sensor system 300 are communicatively connected. The sensor system 300 may be dedicated to one, some or all of the connection sites 140, or common to the vehicle 100. Similarly, the control module 302 may be dedicated to one, some or all of the connection sites 140, or be a global control module 302 for the vehicle 100. For instance, as part of a central control system, the vehicle 100 may include a global control unit (e.g., an onboard ECU) to which the control module 302 belongs.

As part of the sensor system 300, the vehicle 100 includes one or more onboard sensors. The sensors monitor the vehicle 100 in real-time. The sensors, on behalf of the sensor system 300, are operable to detect information about the vehicle 100, including information about the identity of a user. Among the sensors, the vehicle 100 includes any combination of one or more biometric sensors, and one or more receivers. Relatedly, among information about the identity of a user, the sensor system 300 is operable to detect any combination of the biometric characteristics of a user, and the existence of a remote controller (e.g., a key fob, a personal electronic device and the like) on a user's person.

From the perspective of the representative connection site 140, the control module 302 orchestrates the operation of the connection governing system based on information about the vehicle 100, including information about the identity of a user. Accordingly, as a prerequisite to operating the connection governing system, the control module 302 gathers information about the vehicle 100, including information about the identity of a user detected by the sensor system 300. The control module 302 then evaluates the information about the vehicle 100, and operates the connection governing system based on its evaluation.

Under the operation of the connection actuator 224 by the control module 302, the connection governor 222 is normally moved to the closed position. Accordingly, both when the connection site 140 is unoccupied and when the connection site 140 is occupied, the connection site 140 is locked. In anticipation of unlocking the connection site 140, the control module 302 gathers information about the vehicle 100, including information about the identity of a user detected by the sensor system 300. The control module 302 then evaluates the information about the vehicle 100, including monitoring for and identifying a user. When the control module 302 does not identify a user, the control module 302 does not operate the connection actuator 224 to move the connection governor 222 from the closed position to the open position. Accordingly, the connection site 140 remains locked.

Otherwise, when the control module 302 identifies a user, the control module 302 unlocks the connection site 140 for the identified user by operating the connection actuator 224 to move the connection governor 222 from the closed position to the open position. Relatedly, when the connection site 140 is unoccupied, in conjunction with the movement of the handle 102 in the connection directions, the control module 302 governs the connection process by operating the connection actuator 224 to move the connection governor 222 between the open position and the closed position. And, when the connection site 140 is occupied, in conjunction with the movement of the handle 102 in the disconnection directions, the control module 302 governs the disconnection process by operating the connection actuator 224 to move the connection governor 222 between the open position and the closed position.

Under the orchestration of the operation of the connection governing system by the control module 302, a user may leave the connection site 140 unoccupied with the comfort of knowing that unidentified users will not be able to connect the handle 102 or similar handles to the vehicle 100. In the case of a home connection site 140 on the exterior 104 of the door 122, for instance, a user may leave the home connection site 140 unoccupied with the comfort of knowing that, with no exterior door handle to operate, there is no prospect of the door 122 being allowed to open by unidentified users outside the vehicle 100. On the other hand, a user may leave the connection site 140 occupied with the comfort of knowing that unidentified users will not be able to remove the handle 102 from the vehicle 100.

As noted above, when connected to the vehicle 100 at a home connection site 140, from its corresponding location on the door 122, the handle 102 is subject to being operated by a user to allow the door 122 to open. Specifically, as shown with additional reference to FIG. 4A for a representative home connection site 140 on the exterior 104 of the door 122, the vehicle 100 includes a locking system 400 for the door 122. The locking system 400 serves as the connection system 200 at the home connection site 140. For purposes of being operated by a user to allow the door 122 to open, when connected to the vehicle 100 at the home connection site 140, the handle 102 is incorporated into the locking system 400.

Figure 4A:
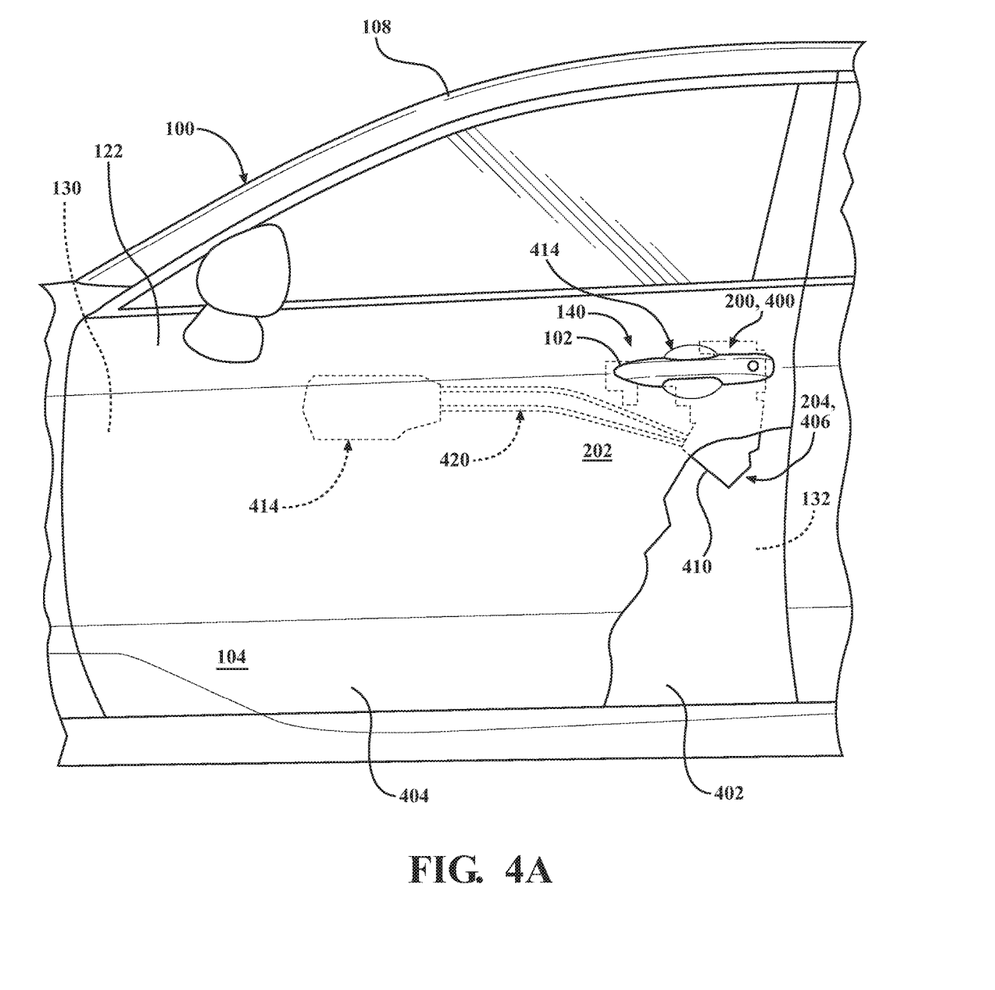
FIG. 4A is a front view of the door, showing a locking system housed by the door, including a latch assembly that embodies a closing subsystem for closing the door, and handle assemblies and a linkage that embody an opening subsystem for locking and unlocking the door, as well as for opening the door.

The door 122, as shown, includes an upright inner door panel 402 and an upright outer door panel 404. The inner door panel 402 and the outer door panel 404 are hemmed together or otherwise rigidly interconnected to one another along the peripheral door area. Otherwise, the inner door panel 402 and the outer door panel 404 are laterally spaced apart from one another. As a result, the door 122 has an interior door cavity 406 defined between the inner door panel 402 and the outer door panel 404. The locking system 400 is housed by the door 122 in the space afforded by the interior door cavity 406. The locking system 400 operates to close the door 122, selectively lock the door 122, and open the door 122. The locking system 400 has a closing subsystem, whose components serve to close the door 122, and an opening subsystem, whose components serve to selectively lock the door 122, as well as to open the door 122.

Figure 4B:
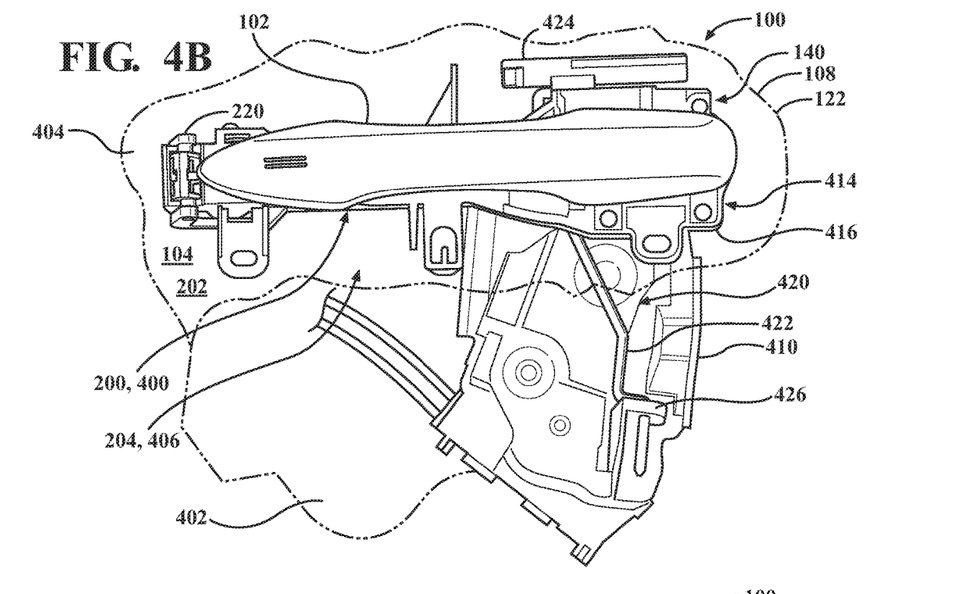
FIG. 4B is a cutaway partial side view of the door, showing the locking system serving as the connection system at the home connection site, as well as aspects of the handle, when connected to the vehicle at the home connection site, being incorporated into the locking system, and serving as a door handle.
Figure 4C:
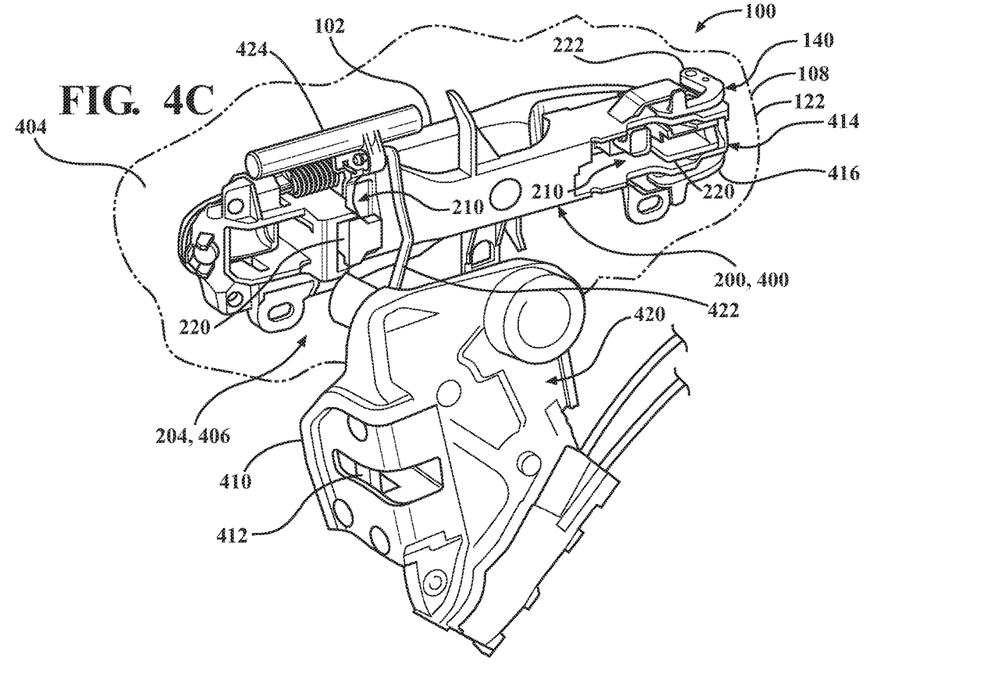
FIG. 4C is a cutaway partial side view of the door, further showing aspects of the handle, when connected to the vehicle at the home connection site, being incorporated into the locking system, and serving as a door handle.

As shown with additional reference to FIGS. 4B and 4C, the closing subsystem is embodied by a latch assembly 410. Although the vehicle 100, as shown, includes one latch assembly 410, it will be understood that this disclosure is applicable in principle to an otherwise similar vehicle 100 including multiple latch assemblies 410 in the closing subsystem. The latch assembly 410 is rigidly mounted to the door 122 as a unitary module. The latch assembly 410 includes a latch 412. The latch 412 has a latching position and an unlatching position. The latch assembly 410 supports the latch 412, at the periphery of the door 122, for movement relative to the door 122 between the latching position and the unlatching position. Specifically, from the latching position, the latch assembly 410 supports the latch 412 for actuation or, in other words, movement to the unlatching position. The latch assembly 410 also supports the latch 412 for movement from the unlatching position to the latching position.

The latch 412 principally functions as the door 122 is moved from the open position to the closed position, and afterward, when the door 122 is in the closed position. As the door 122 is moved from the open position to the closed position, the latch 412 contacts the surrounding body 108. This contact triggers movement of the latch 412 from the unlatching position to the latching position. In the latching position, the latch 412 is latched to the surrounding body 108. Afterward, with the latch 412 in the latching position, the door 122 is held in the closed position. The door 122 is thus closed. The latch 412 is actuated, on the other hand, via return movement to the unlatching position. In the unlatching position, the latch 412 is unlatched from the surrounding body 108. With the latch 412 in the unlatching position, the door 122 is allowed to open or, in other words, move from the closed position to the open position.

The opening subsystem is embodied by one or more handle assemblies 414. Each handle assembly 414 is rigidly mounted to the door 122 as a unitary module. The opening subsystem includes two handle assemblies 414, one of which is an interior handle assembly 414 at the inside of the door 122, and one of which is an exterior handle assembly 414 at the outside of the door 122. The interior handle assembly 414 is rigidly mounted to the inner door panel 402, and the exterior handle assembly 414 is rigidly mounted to the outer door panel 404. In relation to the home connection site 140, this description follows with reference to the exterior handle assembly 414. However, it will be understood that this disclosure is applicable in principle to the remaining, interior handle assembly 414.

The handle assembly 414 includes a bezel or other base 416 by which the handle assembly 414 is rigidly mounted to the door 122. When the home connection site 140 is occupied, the handle assembly 414, as shown, additionally includes the handle 102. The handle 102 has a home position and a latch actuating position. The handle assembly 414 supports the handle 102, by the projection 220 received in the connection governor 222, for pivotation or other movement relative to the door 122 between the home position and the latch actuating position. Specifically, from the home position, the handle assembly 414 supports the handle 102 for operation or, in other words, movement to the latch actuating position. In the typical implementation where the handle 102 is operated via lateral movement away from the door 122 to the latch actuating position, the handle 102 is subject to being operated by a user via the user pulling the handle 102 away from the door 122. The handle assembly 414 also supports the handle 102 for automatic return movement from the latch actuating position to the home position.

The opening subsystem is further embodied by a linkage 420. The linkage 420 is rigidly mounted to the door 122. The linkage 420 may be rendered by any combination of one or more parts of the handle assembly 414, one or more parts of the latch assembly 410, and one or more standalone items. The linkage 420 is connected between the handle 102 belonging to the handle assembly 414, on the one hand, and the latch 412 that belongs to the latch assembly 410, on the other hand. Accordingly, from the perspective of the handle 102, the linkage 420 is connected from the handle 102 to the latch 412. From the perspective of the latch 412, the linkage 420 is connected to the latch 412 from the handle 102.

The linkage 420 includes a succession of one or more interconnected links. The links each have a home position and a latch actuating position. The linkage 420 supports the links for movement relative to the door 122 between the home positions and the latch actuating positions. Specifically, from the home positions, the linkage 420 supports the links for excitation or, in other words, movement to the latch actuating positions. The linkage 420 also supports the links for automatic return movement from the latch actuating positions to the home positions.

The linkage 420 includes an elongate lock rod 422. The lock rod 422 is connected between the handle assembly 414 and the latch assembly 410. Relatedly, beyond the standalone lock rod 422, the linkage 420 is rendered by part of the handle assembly 414, and by part of the latch assembly 410. In order of succession from the handle 102, the linkage 420 includes a bell crank 424 included as part of the handle assembly 414, the lock rod 422, a lever 426 included as part of the latch assembly 410, to which the lock rod 422 is connected, as well as one or more cable assemblies, bell cranks, levers and like links.

The handle assembly 414, on behalf of the linkage 420, supports the bell crank 424 for pivotation between the home position and the latch actuating position, with the bell crank 424 being excited via pivotation from the home position to the latch actuating position. In relation to the handle 102, the bell crank 424 is complementary to another one of the projections 220. With the handle assembly 414 supporting the handle 102 by the projection 220 received in the connection governor 222 for pivotation, the other projection 220 is engaged behind the bell crank 424.

The opening subsystem principally functions when the door 122 is closed, with the handle 102 in the home position. With the handle 102 in the home position, all of the links are in the home positions as well. The opening subsystem is subject to selective activation and deactivation by either the vehicle 100 (e.g., via an onboard ECU) or a user (e.g., via onboard or remote lock and unlock buttons), or both. When the opening subsystem is activated, and the handle 102 is operated, the linkage 420 is operable to translate the associated movement of the handle 102 to the latch actuating position into movement of the latch 412 to the unlatching position. Specifically, with the linkage 420 operating as the succession of links, starting at the bell crank 424, a link-to-link succession of exciting all of the links is triggered, which ultimately triggers the actuation of the latch 412. Accordingly, the linkage 420 is responsive to the operation of the handle 102 to actuate the latch 412. With the prospect of the door 122 being thereby allowed to open, the door 122 is thus unlocked.

With the door 122 closed and the handle 102 in the home position, the opening subsystem alternatingly functions to either allow the door 122 to open or keep the door 122 closed. The opening subsystem functions to keep the door 122 closed by eliminating the prospect of the door 122 being allowed to open. Specifically, there is no prospect of the door 122 being allowed to open, even if the handle 102 is operated, when the door 122 is locked by deactivating the opening subsystem.

As detailed above, the handle 102 is configured to serve an on-vehicle role when connected to the vehicle 100 at a connection site 140. As shown with additional reference to FIGS. 5A-E, in one implementation, the handle 102 includes any combination of integrated implements configured to serve one or more associated off-vehicle roles. Relatedly, when disconnected from the vehicle 100, the handle 102 is thereby configured to serve one or more associated off-vehicle roles in the hands of a user.

Figures 5A, 5B, 5C, 5D, 5E:
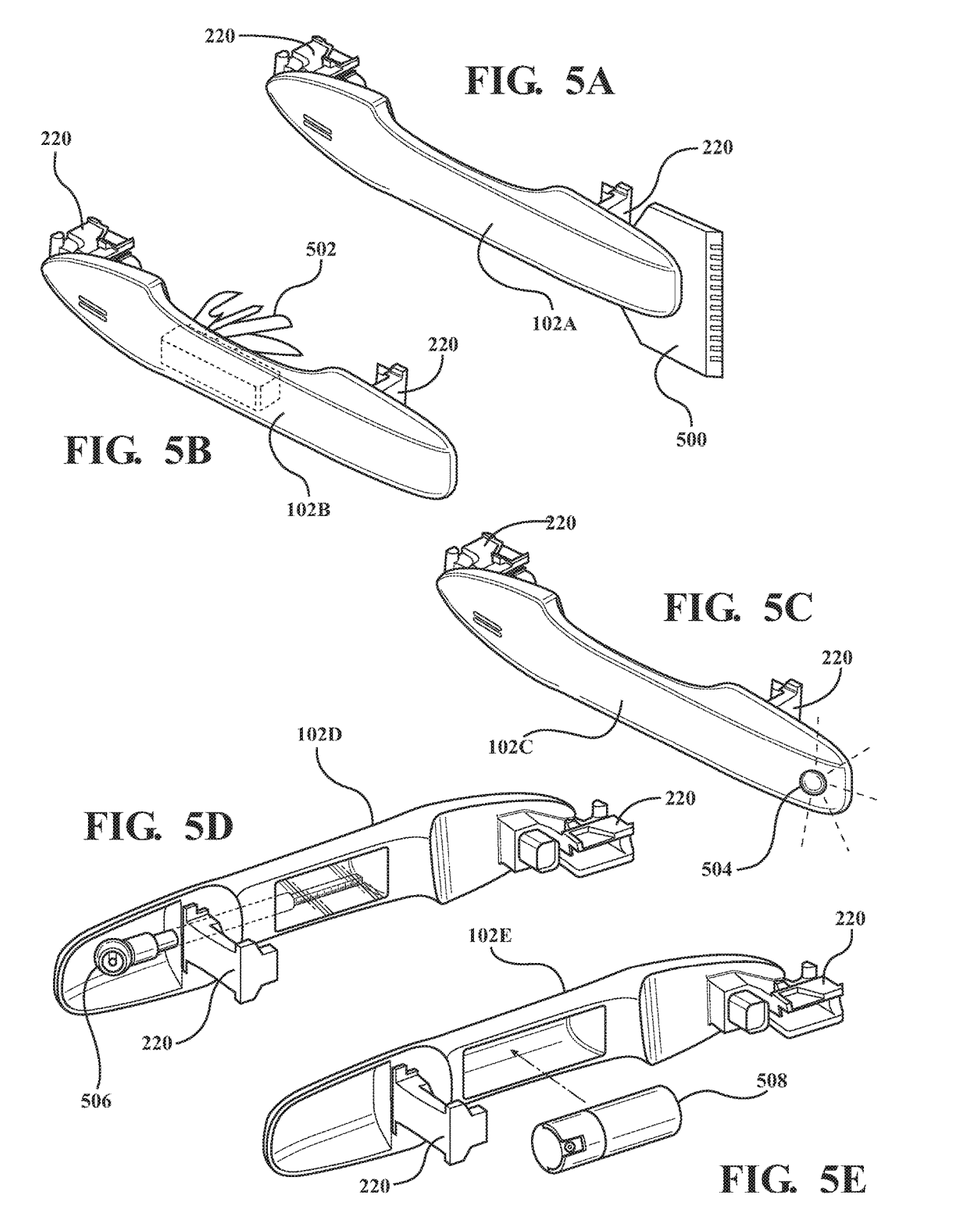
FIGS. 5A-E represent, with reference to perspective views of the handle, the handle serving a number of off-vehicle roles in the hands of a user when disconnected from the vehicle.

For instance, as shown in FIG. 5A, the handle 102A includes an integrated ice scraper 500, and is thereby configured to scrape ice. For instance, as shown in FIG. 5B, the handle 102B includes an integrated tool 502, such as multi-tool, and is thereby configured to work everyday objects. For instance, as shown in FIG. 5C, the handle 102C includes an integrated light 504, and is thereby configured to illuminate objects. For instance, as shown in FIG. 5D, the handle 102D includes an integrated tire pressure gauge 506 or other gauge, and is thereby configured to gauge information about the vehicle 100, such as tire pressure. For instance, as shown in FIG. 5E, the handle 102E includes an integrated pepper spray canister 508, and is thereby configured to defend against offensive contact.

Figure 6:
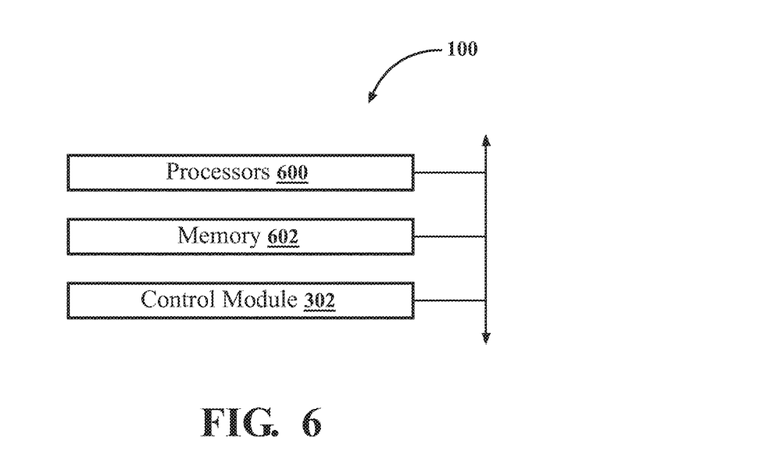
FIG. 6 is a further portrayal of the vehicle using a block diagram, further showing aspects of the control module.

As shown with additional reference to FIG. 6, in relation to the control module 302, the vehicle 100 includes one or more processors 600 and memory 602 to which the control module 302 is communicatively connected. The processors 600, the memory 602 and the control module 302 together serve as a computing device whose control module 302 is employable to orchestrate the operation of the connection governing system.

The processors 600 are any components configured to execute any of the processes described herein or any form of instructions to carry out such processes or cause such processes to be performed. The processors 600 may be implemented with one or more general-purpose or special-purpose processors. Examples of suitable processors 600 include microprocessors, microcontrollers, digital signal processors or other forms of circuitry that execute software. Other examples of suitable processors 600 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processors 600 may include at least one hardware circuit (e.g., an integrated circuit) configured to carry out instructions contained in program code. In arrangements where there are multiple processors 600, the processors 600 may work independently from each other or in combination with one another.

The memory 602 is a non-transitory computer readable medium. The memory 602 may include volatile or nonvolatile memory, or both. Examples of suitable memory 602 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 602 includes stored instructions in program code. Such instructions are executable by the processors 600 or the control module 302. The memory 602 may be part of the processors 600 or the control module 302, or may be communicatively connected the processors 600 or the control module 302.

Generally speaking, the control module 302 includes instructions that may be executed by the processors 600. The control module 302 may be implemented as computer readable program code that, when executed by the processors 600, execute one or more of the processes described herein. Such computer readable program code may be stored on the memory 602. The control module 302 may be part of the processors 600, or may be communicatively connected the processors 600.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
    a body defining a passenger compartment and a door opening, the body including a door over the door opening;
    a handle; and
    at least one connection site for the handle at which the handle is selectively connectable to the vehicle, the at least one connection site including a home connection site on the door, wherein when connected to vehicle at the home connection site, the handle, from a corresponding location thereof on the door, is subject to being operated by a user to allow the door to open.

2. The vehicle of claim 1, wherein the home connection site is on an exterior of the door.

3. The vehicle of claim 2, wherein the exterior of the door defines an entryway for the handle through which the handle is enterable during a connection process of the handle to the vehicle at the home connection site, and the door includes a retractable cover for the entryway.

4. The vehicle of claim 1, wherein the door houses a locking system, and when connected to vehicle at the home connection site, the handle is incorporated into the locking system, and thereby subject to being operated by a user to allow the door to open.

5. The vehicle of claim 1, wherein the door houses a locking system that includes a linkage and a latch, and when the handle is connected to vehicle at the home connection site, the linkage is connected from the handle to the latch, and responsive to the handle being operated by a user to actuate the latch, and thereby allow the door to open.

6. The vehicle of claim 1, wherein the at least one connection site further includes a supplemental connection site on the vehicle elsewhere than the door, wherein when connected to vehicle at the supplemental connection site, the handle, from a corresponding location thereof on the vehicle, is subject to being grabbed by a user for support.

7. The vehicle of claim 1, wherein the handle includes an integral implement, and when disconnected from the vehicle, the handle, in the hands of a user, is configured to serve an off-vehicle role associated with the implement.

8. The vehicle of claim 7, wherein the implement is at least one of an ice scraper, a tool, a light, a gauge and a pepper spray canister.

9. The vehicle of claim 1, further comprising:
a connection governing system; and
at least one control module, the at least one control module communicatively connected to the connection governing system, and configured to, in response to identifying a user, operate the connection governing system to unlock the home connection site for connecting the handle to the vehicle at the home connection site.

10. The vehicle of claim 1, further comprising:
a connection governing system; and
at least one control module, the at least one control module communicatively connected to the connection governing system, and configured to operate the connection governing system to govern, in conjunction with a user's movement of the handle, at least one of a connection process of the handle to the vehicle at the home connection site, and a disconnection process of the handle from the vehicle.

11. A vehicle, comprising:
a body defining a passenger compartment and a door opening, the body including a door over the door opening;
a handle; and
multiple connection sites for the handle at which the handle is selectively connectable to the vehicle, the multiple connection sites including a supplemental connection site on the vehicle elsewhere than the door, wherein when connected to vehicle at the supplemental connection site, the handle, from a corresponding location thereof on the vehicle, is subject to being grabbed by a user for support.

12. The vehicle of claim 11, wherein the supplemental connection site is on the vehicle around the door opening.

13. The vehicle of claim 11, wherein the supplemental connection site is on the vehicle about the passenger compartment.

14. The vehicle of claim 11, wherein the multiple connection sites further include a home connection site on the door, wherein when connected to vehicle at the home connection site, the handle, from a corresponding location thereof on the door, is subject to being operated by a user to allow the door to open.

15. The vehicle of claim 11, wherein the handle includes an integral implement, and when disconnected from the vehicle, the handle, in the hands of a user, is configured to serve an off-vehicle role associated with the implement.

16. The vehicle of claim 11, wherein the implement is at least one of an ice scraper, a tool, a light, a gauge and a pepper spray canister.

17. A vehicle, comprising:
a body defining a passenger compartment and a door opening, the body including a door over the door opening;
a handle, the handle including an integral implement; and
at least one connection site for the handle at which the handle is selectively connectable to the vehicle, wherein when disconnected from the vehicle, the handle, in the hands of a user, is configured to serve an off-vehicle role associated with the implement.

18. The vehicle of claim 17, wherein the implement is at least one of an ice scraper, a tool, a light, a gauge and a pepper spray canister.

19. The vehicle of claim 17, wherein the at least one connection site further includes a home connection site on the door, wherein when connected to vehicle at the home connection site, the handle, from a corresponding location thereof on the door, is subject to being operated by a user to allow the door to open.

20. The vehicle of claim 17, wherein the at least one connection site further includes a supplemental connection site on the vehicle elsewhere than the door, wherein when connected to vehicle at the supplemental connection site, the handle, from a corresponding location thereof on the vehicle, is subject to being grabbed by a user for support.

* * * * *